(12) United States Patent
Nakamura et al.

(10) Patent No.: US 7,792,624 B2
(45) Date of Patent: Sep. 7, 2010

(54) CRUISE CONTROL SYSTEM

(75) Inventors: Masahide Nakamura, Yokohama (JP); Shinji Matsumoto, Yokohama (JP); Tatsuya Suzuki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 511 days.

(21) Appl. No.: 11/525,042

(22) Filed: Sep. 22, 2006

(65) Prior Publication Data

US 2007/0078584 A1    Apr. 5, 2007

(30) Foreign Application Priority Data

Oct. 5, 2005    (JP)    ............................. 2005-292722

(51) Int. Cl.
B60W 30/14    (2006.01)
B60T 7/12    (2006.01)

(52) U.S. Cl. .............................. 701/72; 701/70; 701/93; 701/97; 340/437; 340/438

(58) Field of Classification Search .................. 701/93, 701/70, 72, 94, 95, 96, 97, 98; 340/437, 340/438, 441
See application file for complete search history.

(56) References Cited

U.S. PATENT DOCUMENTS

| | | | |
|---|---|---|---|
| 6,047,235 A * | 4/2000 | Hiyokawa et al. | 701/201 |
| 6,141,617 A | 10/2000 | Matsuda et al. | |
| 6,868,324 B2 * | 3/2005 | Matsumoto et al. | 701/72 |
| 7,266,438 B2 * | 9/2007 | Kellum et al. | 701/93 |
| 7,469,178 B2 * | 12/2008 | Shiiba et al. | 701/70 |
| 2004/0068359 A1 | 4/2004 | Neiss et al. | |

FOREIGN PATENT DOCUMENTS

| | | | |
|---|---|---|---|
| JP | 2000-025538 A | | 1/2000 |
| JP | 2002-163786 A | | 6/2002 |
| JP | 2002163786 A | * | 6/2002 |

OTHER PUBLICATIONS

An English translation of the Chinese Office Action of corresponding Chinese Application No. 200810134205.3, dated Oct. 23, 2009.

* cited by examiner

*Primary Examiner*—Thomas G Black
*Assistant Examiner*—Peter D Nolan
(74) *Attorney, Agent, or Firm*—Global IP Counselors, LLP (57) ABSTRACT

A cruise control system includes a curve state detecting section, a target deceleration rate calculating section, a deceleration control section, a map matching detecting section, a position evaluating section and a revising section. The deceleration control section is configured to execute deceleration control within a deceleration control region before a curve existing in front of the vehicle. The map matching detecting section is configured to detect whether a map matching operation caused a vehicle traveling position to move onto a traveling road. The revising section is configured to perform at least one of increasing a deceleration rate of the vehicle and extending an end position of a deceleration control region to a position inside the curve based on a positional relationship between the vehicle traveling position and the curve when the vehicle traveling position after the map matching operation is within the deceleration control region.

7 Claims, 9 Drawing Sheets

CRUISE CONTROL SYSTEM

CROSS-REFERENCE TO RELATED APPLICATIONS

This application claims priority under 35 U.S.C. §119 to Japanese Patent Application No. 2005-292722. The entire disclosure of Japanese Patent Application No. 2005-292722 is hereby incorporated herein by reference.

BACKGROUND OF THE INVENTION

1. Field of the Invention

The present invention relates to a cruise control system for a vehicle. More specifically, the present invention relates to a cruise control system that is configured to execute deceleration control of a host vehicle before the host vehicle enters a curve.

2. Background Information

One example of a conventional cruise control system is disclosed in Japanese Laid-Open Patent Publication No. 2000-25538. This cruise control system determines if a host vehicle equipped with the cruise control system is properly traveling on a designated road and aborts a warning issuance control and/or an automatic deceleration control if the cruise control system determines that the host vehicle has deviated from the designated road.

In view of the above, it will be apparent to those skilled in the art from this disclosure that there exists a need for an improved cruise control system. This invention addresses this need in the art as well as other needs, which will become apparent to those skilled in the art from this disclosure.

SUMMARY OF THE INVENTION

In the conventional cruise control system disclosed in the above mentioned reference, there are cases in which, due to map matching operations, the cruise control system switches from a state in which a detected traveling location of the host vehicle does not match a traveling road in a map in the navigation system to a state in which the detected traveling location of the host vehicle matches the traveling road in the map in the navigation system. Depending on the timing of the switch, there is the possibility that the conventional cruise control system will suddenly detect an upcoming curve on the traveling road directly in front of the host vehicle immediately after the switch. However, the conventional cruise control system does not address what kind of deceleration control should be executed in the case of such an imminent curve.

The present invention was conceived in view of this issue and one object of the present invention is to provide a cruise control system configured to execute a deceleration control that is appropriate for an upcoming curve when the cruise control system suddenly detects the upcoming curve directly in front of a host vehicle due to map matching executed by the navigation system.

In order to achieve the above mentioned object, a cruise control system includes a curve state detecting section, a target deceleration rate calculating section, a deceleration control section, a map matching detecting section, a position evaluating section and a revising section. The curve state detecting section is configured to detect a curve state of a curve existing in front of a vehicle based on information obtained by a navigation system. The target deceleration rate calculating section is configured to calculate a target deceleration rate at which the vehicle is decelerated within a deceleration control region before the curve based on the curve state detected by the curve state detecting section. The deceleration control section is configured to execute deceleration control of the vehicle within the deceleration control region based on the target deceleration rate calculated by the target deceleration rate calculating section. The map matching detecting section is configured to detect whether a map matching operation executed by the navigation system caused a vehicle traveling position in a map to move onto a traveling road on which the vehicle is estimated to be traveling. The position evaluating section is configured to determine whether the vehicle traveling position after the map matching operation is within the deceleration control region. The revising section is configured to increase a deceleration rate of the vehicle based on a positional relationship between the vehicle traveling position and the curve existing in front of the vehicle when the position evaluating section determines that the vehicle traveling position after the map matching operation is within the deceleration control region.

In accordance with another aspect of the present invention, the revising section is configured to extend an end position of the deceleration control region to a position inside the curve when the position evaluating section determines that the vehicle traveling position after the map matching operation is within the deceleration control region.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
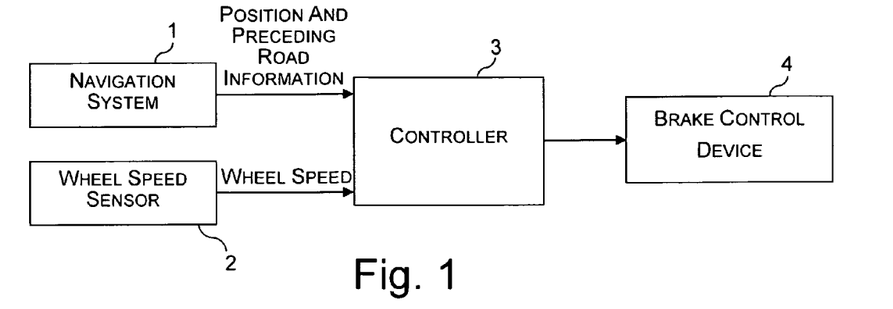
FIG. 1 is a block diagram illustrating the constituent features of a cruise control system in accordance with an embodiment of the present invention.

FIG. 1 is a block diagram of the cruise control system (deceleration control system) in accordance with one embodiment of the present invention. As shown in FIG. 1, the cruise control system includes a navigation system 1, a wheel speed sensor 2, a controller 3 and a brake control device 4 (brake control section).

The navigation system 1 is configured to detect a current vehicle traveling position using a GPS (global positioning system) and to determine node point information (preceding road information) regarding the road on which the vehicle is traveling based on the detected vehicle traveling position, the map information and/or the traveling route information. The navigation systems are well known, and thus, the conventional features of the navigation system 1 will not be discussed and/or illustrated herein. Rather this disclosure will focus on features of the navigation system 1 for carrying out the present invention. The navigation system 1 is configured to send the search results (the vehicle traveling position and the node point information) to the controller 3 as position and preceding road information. The navigation system 1 is further configured to execute map matching operation to match the detected vehicle traveling position with the map data. More specifically, in the map matching operation, the navigation system 1 is configured to move the vehicle position in the map onto a road on which the vehicle is estimated to be actually driving if the detected vehicle traveling position is on or off a road on which the vehicle is not actually traveling. The map matching operation will be discussed in more detail below with reference to FIGS. 3 and 4.

The wheel speed sensor 2 is configured and arranged to measure the vehicle speed based on the wheel speed and to send the measurement result (wheel speed) to the controller 3.

The controller 3 is configured to calculate a radius of curvature of a preceding curve in front of the vehicle (hereinafter called "preceding curve radius of curvature") based on the vehicle traveling position information and the node point information received from the navigation system 1. Then, the controller 3 is configured to set a target vehicle speed for the preceding curve based on the calculated preceding curve radius of curvature and a set lateral acceleration rate set by the driver. The controller 3 is configured to calculate a target deceleration rate based on the target vehicle speed and the current vehicle speed. The controller 3 is then configured to send a brake fluid pressure command value for generating the calculated target deceleration rate to the brake control device 4.

When the map matching operation executed by the navigation system 1 causes a curve to be suddenly detected directly in front of the vehicle (i.e., when the vehicle traveling position is moved due to the map matching operation to a position on the traveling road immediately before a curve), the controller 3 is configured to determine whether or not to execute deceleration control with respect to the detected curve. When the controller 3 determines that deceleration control should be executed, the controller 3 is configured to send a brake fluid pressure command value (e.g., a revising value) for generating the calculated target deceleration rate to the brake control device 4. The brake control device 4 is configured to execute automatic braking based on the brake fluid pressure command value from the controller 3.

Figure 2:
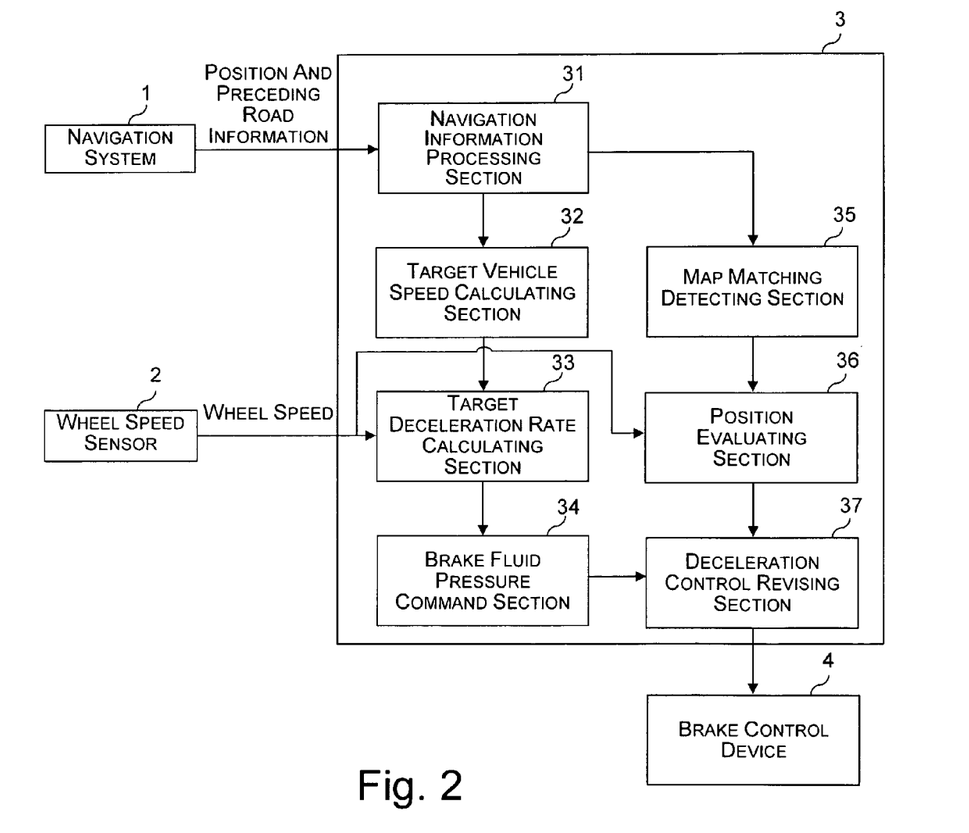
FIG. 2 is a block diagram illustrating the constituent features of a controller of the cruise control system in accordance with the embodiment of the present invention.

FIG. 2 is a block diagram illustrating the constituent features (processing logic) of the controller 3. The controller 3 preferably includes a microcomputer with a deceleration control program that controls the deceleration control as discussed below. The controller 3 can also include other conventional components such as an input interface circuit, an output interface circuit, and storage devices such as a ROM (Read Only Memory) device and a RAM (Random Access Memory) device. The microcomputer of the controller 3 is programmed to control the brake control device 4 and other components of the vehicle. The memory circuit stores processing results and control programs such as ones for deceleration control operations that are run by the processor circuit. The controller 3 is operatively coupled to the navigation system 1, the wheel speed sensor 2, and the brake control device 4 in a conventional manner. The internal RAM of the controller 3 stores statuses of operational flags and various control data. The internal ROM of the controller 3 stores the control programs for various operations. The controller 3 is capable of selectively controlling any of the components of the control system in accordance with the control program. It will be apparent to those skilled in the art from this disclosure that the precise structure and algorithms for the controller 3 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

As seen in FIG. 2, the controller 3 includes a navigation information processing section 31 (a curve state detecting section), a target vehicle speed calculating section 32, a target deceleration rate calculating section 33, a brake fluid pressure command section 34 (brake fluid pressure calculating section), a map matching detecting section 35, a position evaluating section 36, and a deceleration control revising section 37. The brake fluid pressure command section 34 and the brake control device 4 preferably constitute a deceleration control section of the present invention.

The navigation information processing section 31 is configured to calculate the radius of curvature and the curve direction of the preceding curve based on the node point information of the preceding node points obtained from the navigation system 1. The navigation information processing section 31 is further configured to output the calculated radius of curvature and the curve direction to the target vehicle speed calculating section 32. The navigation information processing section 31 is also configured to send a map matching operation information to the map matching detecting section 35.

The target vehicle speed calculating section 32 is configured to calculate a target vehicle speed for the preceding curve based on the radius of curvature and the curve direction of the preceding curve obtained from the navigation information processing section 31. The target vehicle speed calculating section 32 is further configured to send the calculated target vehicle speed to the target deceleration rate calculating section 33.

The target deceleration rate calculating section 33 is configured to calculate a target deceleration rate required to reach the target vehicle speed at the preceding curve based on the target vehicle speed obtained by the target vehicle speed calculating section 32 and the vehicle speed obtained with the wheel speed sensor 2. The target deceleration rate calculating section 33 is then configured to send the target deceleration rate to the brake fluid pressure command section 34.

The brake fluid pressure command section 34 is configured to send a brake fluid pressure command value for generating the target deceleration rate obtained from the target deceleration rate calculating section 33 to the deceleration control revising section 37.

Based on the map matching operation information obtained by the navigation information processing section 31, the map matching detecting section 35 is configured to determine if the map matching operation executed by the navigation system 1 has caused the vehicle traveling position on the map to move onto the road the vehicle is estimated to be traveling on (i.e., the map matching detecting section 35 is configured to detect if the map matching state has changed). The map matching detecting section 35 is then configured to send the determination result to the position evaluating section 36.

As mentioned above, the navigation system 1 executes the map matching function to move the vehicle position onto the road in the map on which the vehicle is estimated to be traveling when the detected vehicle position does not match the estimated traveling road. The function of the map matching operation is illustrated in more detail in FIGS. 3 and 4. The map matching operation changes the vehicle traveling position from a state in which the detected vehicle traveling position is not matched to any road on the map, i.e., a so-called matching-free state (diagram (A) of FIG. 3), to a state in which the vehicle moves forward and the vehicle traveling position is matched with a road on which the vehicle is estimated to be traveling on (diagram (B) of FIG. 3). As shown in FIG. 4, the map matching operation also changes the vehicle traveling position from a state in which the vehicle traveling position matches a different road on the map (diagram (A) of FIG. 4) to a state in which the vehicle moves forward and the vehicle position is matched with a road on which the vehicle is estimated to be traveling on (diagram (B) of FIG. 4). Although, in the examples presented here, the navigation system 1 is configured to determine that the vehicle traveling position has moved onto a road on which the vehicle is estimated to be traveling when the vehicle traveling position is moved onto a road by map matching, the present invention is not limited to such an arrangement. For example, it is also acceptable to configure the navigation system 1 such that after the vehicle position has been moved onto a road by the map matching operation, the navigation system 1 acquires information regarding the traveling state of the vehicle (e.g., yaw rate and lateral acceleration) and the traveling environment of the vehicle (e.g., road width and road shape). Then, the navigation system 1 is configured to determine (confirm) based on the acquired information if the vehicle position obtained after the map matching operation is on the road the vehicle is actually traveling on.

Referring back to FIG. 2, the position evaluating section 36 is configured to determine if the vehicle position obtained after the map matching operation coincides with a position where deceleration control is to be executed with respect to the preceding curve detected in front of the vehicle. This determination is made based on the determination result obtained from the map matching detecting section 35 and the preceding node point radius of curvature obtained from the navigation information processing section 31.

If the position evaluating section 36 determines that the vehicle traveling position after the map matching operation is in a region where deceleration control should be executed, the deceleration control revising section 37 is configured to revise the control details of the deceleration control (e.g., the control execution time of the deceleration control is extended, the target deceleration rate is increased, and/or the brake fluid pressure command value outputted from the brake fluid pressure command section 34 is increased). Then, the deceleration control revising section 37 is configured to send the revised control command value to the brake control device 4.

The brake control device 4 is configured and arranged to execute deceleration control based on the control command value from the deceleration control revising section 37.

Figure 5:
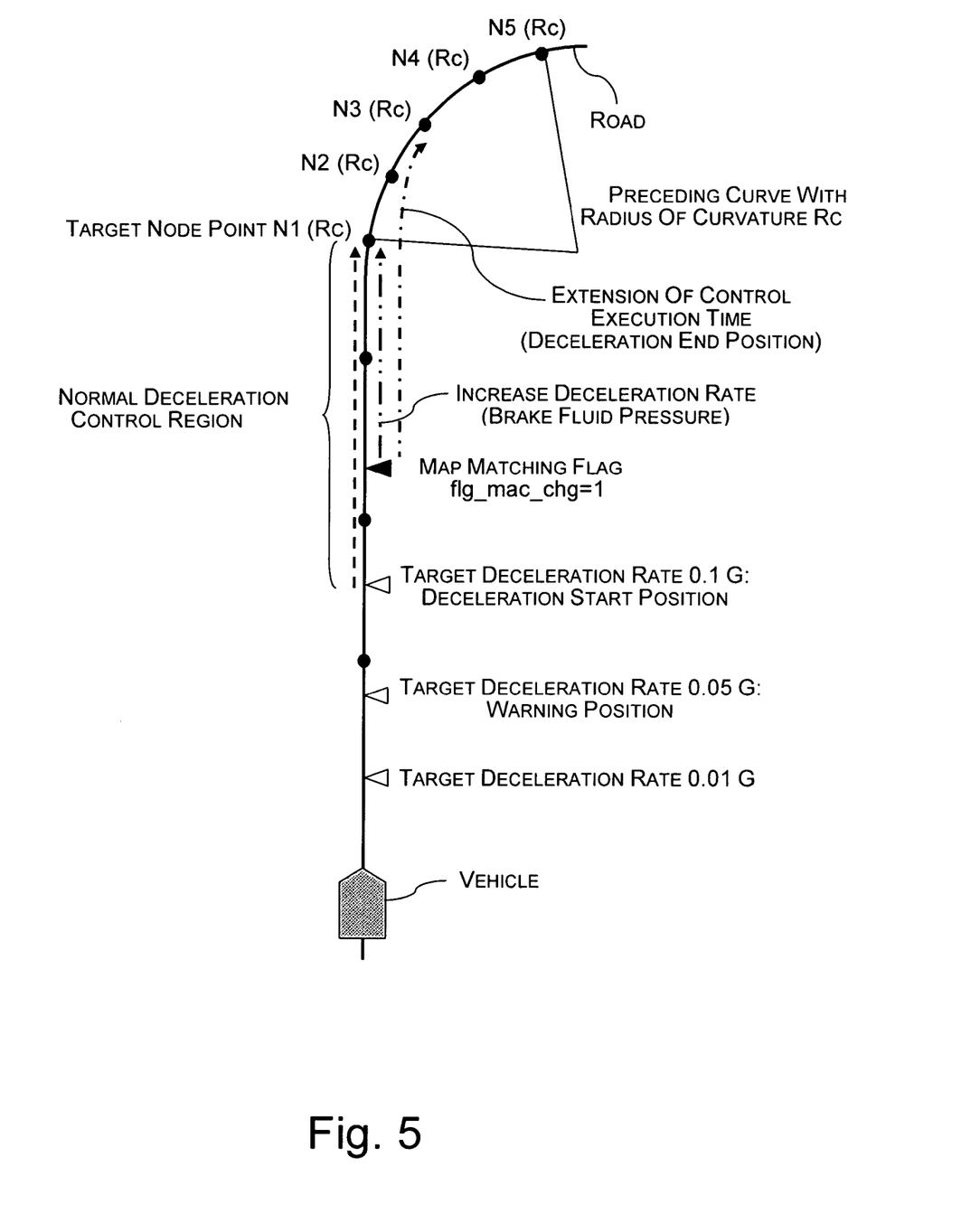
FIG. 5 is a diagram for explaining the timing of the deceleration control executed in the cruise control system in accordance with the embodiment of the present invention.
Figure 6:
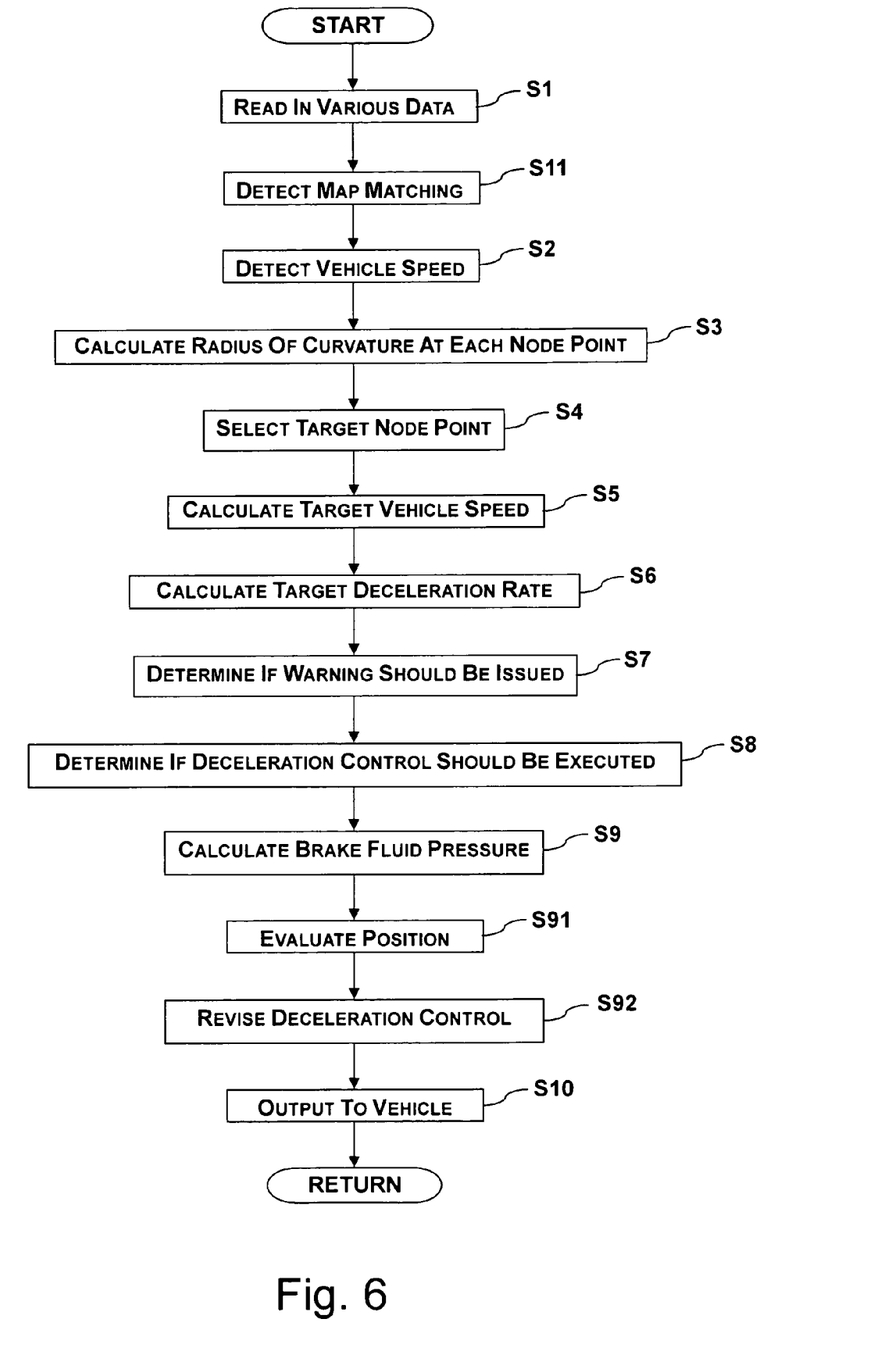
FIG. 6 is a flowchart showing the processing steps of the deceleration control executed by the controller of the cruise control system in accordance with the embodiment of the present invention.

The processing executed by the controller 3 (which comprises the constituent sections described above) will now be explained with reference to FIGS. 5 and 6. FIG. 5 is a diagram for explaining the timing of the deceleration control with respect to the preceding curve and the vehicle traveling position on the road. FIG. 6 is a flowchart of the processing executed by the controller 3 in accordance with the present invention. FIG. 5 illustrates a case in which deceleration control is executed with respect to the preceding curve including node points N1 to N5 with a radius of curvature Rc.

In step S1 of FIG. 6, the controller 3 is configured to read in data from the various sensors. More specifically, the controller 3 is configured to read the longitudinal acceleration $X_g$, the wheel speeds $V_{wi}$ of the wheels (i=1 to 4), the accelerator position A, the master cylinder fluid pressure $P_m$, and the lateral acceleration (set value) $Y_g^*$ from the sensors. Moreover, the controller 3 is configured to read the vehicle position (X, Y), the node point information $(X_j, Y_j, L_j)$ of the node points $N_j$ (j=1 to n, where n is an integer) existing on the road in front of the vehicle, and the map matching information FMACHING from the navigation system 1. Xj and Yj are the coordinates of the respective node point Nj, and Lj is the distance from the vehicle position (X, Y) to the position (Xj, Yj) of the node point Nj. The node points Nj are numbered such that the larger the value of j of each node point Nj (j=1 to n), the farther the node point is from the vehicle.

Figure 3:
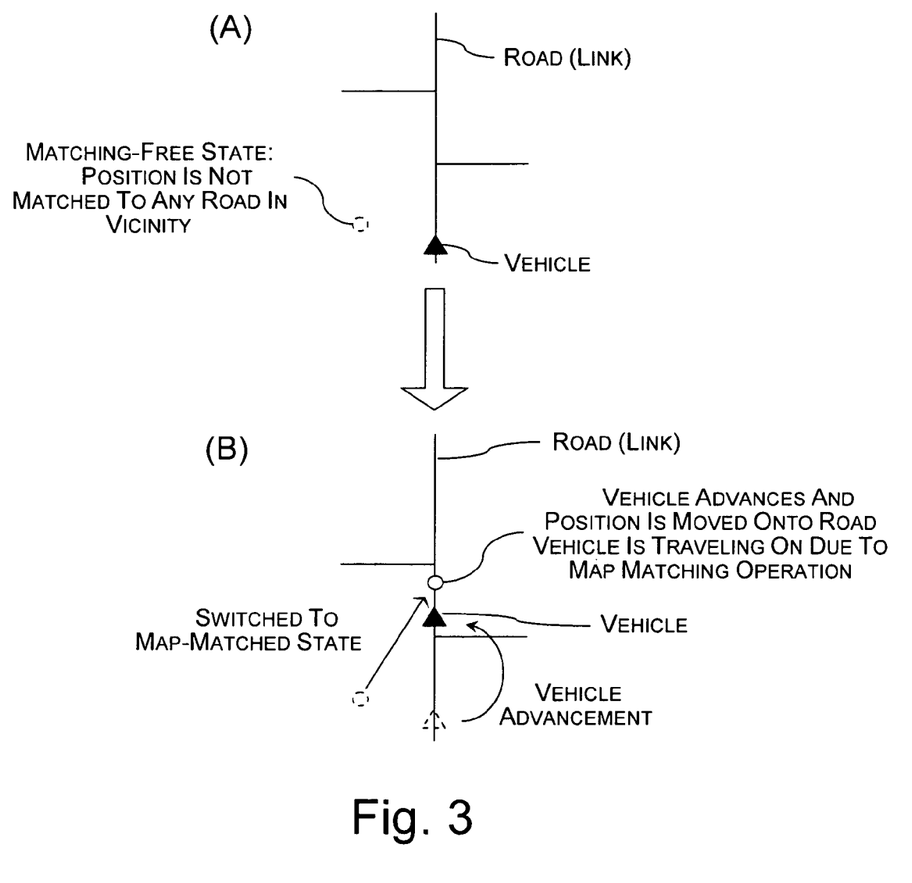
FIG. 3 is a pair of diagrams (A) and (B) illustrating an example of change in the map matching state in the cruise control system in accordance with the embodiment of the present invention.
Figure 4:
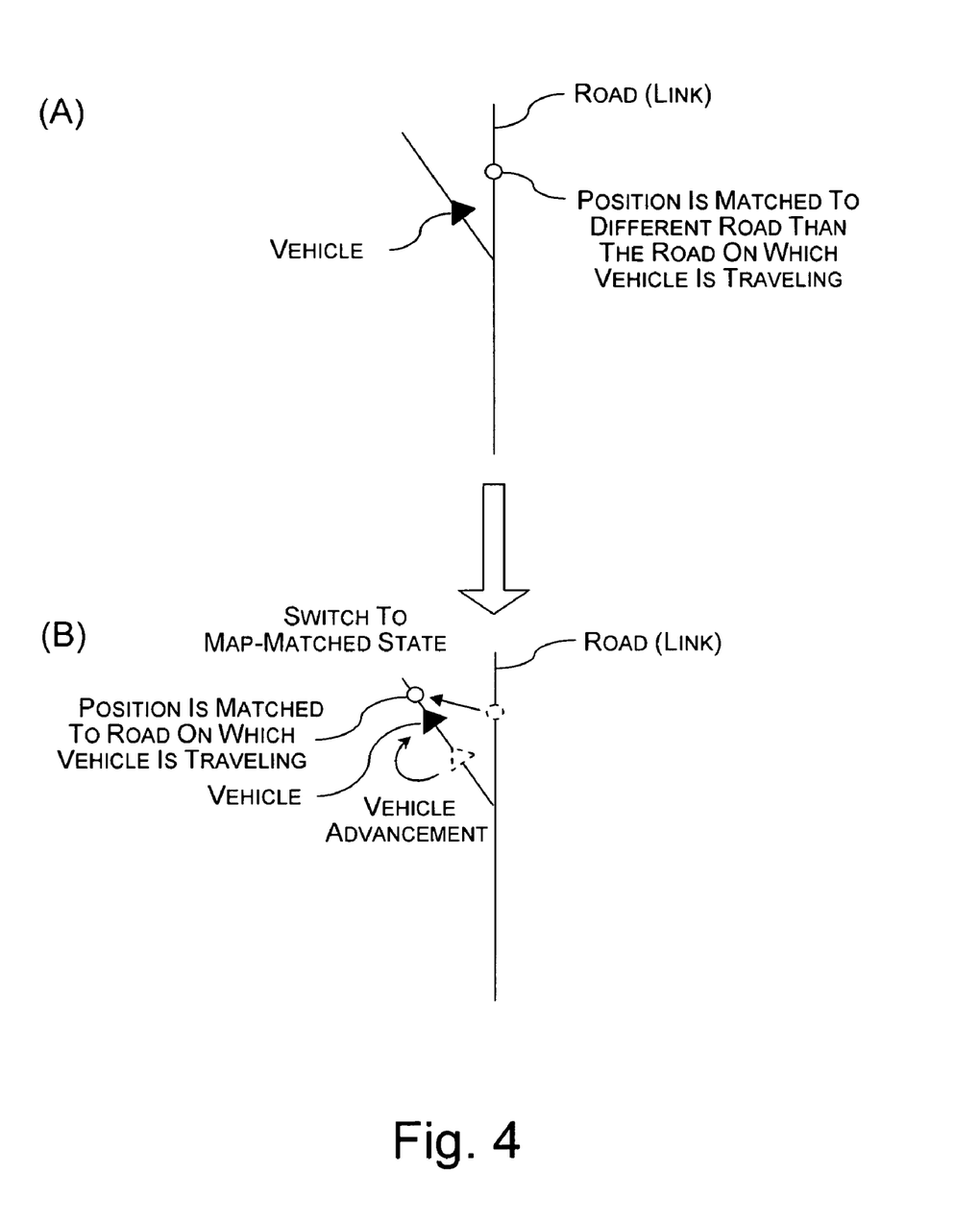
FIG. 4 is a pair of diagram (A) and (B) illustrating another example of change in the map matching state in the cruise control system in accordance with the embodiment of the present invention.

In step S11, the map matching detecting section 35 is configured to determine if the map matching operation executed by the navigation system 1 has caused the vehicle traveling position on a map to move onto a road that the vehicle is estimated to be traveling on (see FIGS. 3 and 4). If the map matching detecting section 35 determines the vehicle traveling position was moved onto the road that the vehicle is estimated to be traveling on, then the map matching detecting section 35 is configured to set the value of a map matching flag flg_mac_chg to 1 (flg_mac_chg=1).

Then in step S2, the controller 3 is configured to calculate the vehicle speed V. The vehicle speed V is calculated by, for example, the target deceleration rate calculating section 33 of the controller 3. More specifically, when the vehicle is traveling in a normal state and the vehicle is a rear-wheel drive vehicle, the vehicle speed V can be calculated as an average value of the two front wheel speeds Vw1 and Vw2 using the equation (1) shown below.

$$V=(Vw1+Vw2)/2 \quad (1)$$

If the vehicle is running with ABS (anti-lock brake system) or other system that operates based on the vehicle speed, the vehicle speed (e.g., estimated vehicle speed) used by that system can be used as the vehicle speed V in step S2.

In step S3, the navigation information processing section 31 is configured to calculate the radius of curvature Rj at each of the node points Nj based on the node point information read in step S1. There are numerous methods by which the radius of curvature Rj might be calculated. In this embodiment, the conventional three-point method is preferably used to calculate the radius of curvature Rj.

In step S4, the navigation information processing section 31 is configured to select a target node point. More specifically, the navigation information processing section 31 is configured to review the radii of curvature Rj calculated in step S3 and selects a target node point to be targeted by the deceleration control from among the node points Nj (j=1 to n) obtained in step S3. For example, the navigation information processing section 31 is configured to select a node point Nj with the radius of curvature Rj that is extremely small or a node point Nj where the curve starts and that is closest to the vehicle. In the example illustrated in FIG. 5, the navigation information processing section 31 is configured to select the node point N1, which corresponds to the point where the curve starts, as the target node point.

Then in step S5, the target vehicle speed calculating section 32 is configured to calculate the target vehicle speed. More specifically, the target vehicle speed calculating section 32 is configured to calculate the target vehicle speed Vr using the equation (2) below based on the radius of curvature Rj at the target node point selected in step S4 and the lateral acceleration value Yg* read in step S1.

$$Vr^2 = Yg^* \times |Rj| \quad (2)$$

The lateral acceleration value Yg* is preferably a prescribed value, e.g., 0.4 G. It is also acceptable for the lateral acceleration Yg* to be a set lateral acceleration that is set by the driver.

With the equation (2), the value of the target vehicle speed Vr increases as the radius of curvature Rj increases.

In step S6, the target deceleration rate calculating section 33 is configured to calculate the target deceleration rate Xgs. More specifically, the target deceleration rate calculating section 33 is configured to calculate the target deceleration rate Xgs with respect to the target node point selected in step S4 using the equation (3) shown below. The target deceleration rate Xgs is calculated based on the vehicle speed V obtained in step S2, the target vehicle speed Vr obtained in step S5, and the distance Lj from the current vehicle position to the target node point.

$$\begin{aligned} Xgs &= (V^2 - Vr^2)/(2 \times Lj) \\ &= (V^2 - Yg^* \times |Rj|)/(2 \times Lj) \end{aligned} \quad (3)$$

The target deceleration rate Xgs is a positive value when it corresponds to slowing down of the vehicle. With this equation (3), the target deceleration rate Xgs increases as the vehicle speed V increases, as the target vehicle speed Vr decreases, as the radius of curvature Rj decreases, and as the distance Lj decreases.

Figure 7:
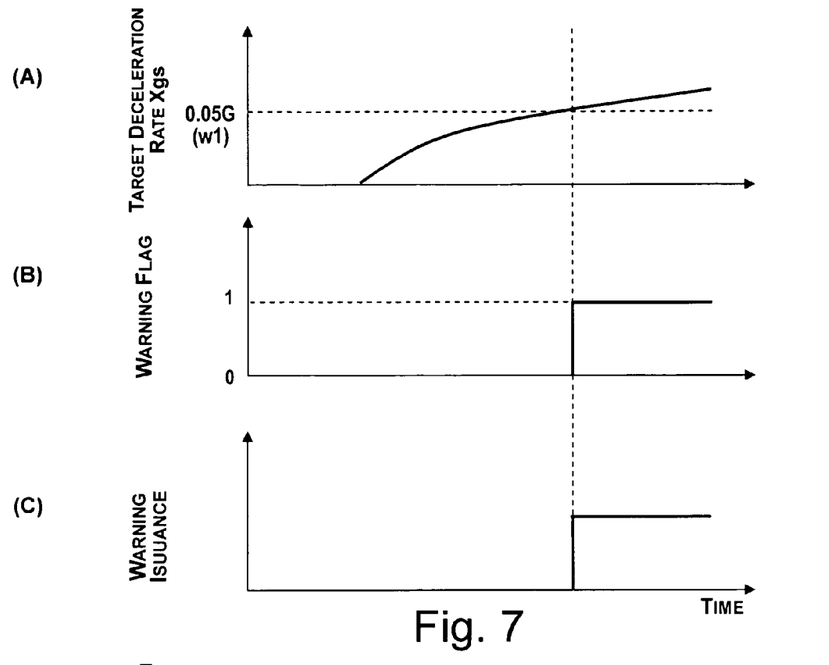
FIG. 7 is a set of time charts (A), (B) and (C) for explaining changes in a target deceleration rate (time chart (A)), a warning flag (time chart (B)) and a warning issuance (time chart (C)) with respect to time in accordance with the present invention.

In step S7, the controller 3 is configured to determine if an alarm or warning to the driver should be issued. For example, a warning issuance determining section (not shown in figures) of the controller 3 is configured to make the determination as to whether or not to issue a warning. FIG. 7 is a set of time charts (A), (B) and (C) illustrating changes in the target deceleration rate Xgs (time chart (A)), the warning flag (time chart (B) and the warning issuance (time chart (C)) with respect to time. As shown in FIGS. 5 and 7, the value of the warning flag is set to 1 (time chart (B) of FIG. 7) when the target deceleration rate Xgs calculated in step S6 is larger than a prescribed value w1 (e.g., 0.05 G) (i.e., Xgs>w1) (time chart (A) of FIG. 7). The warning is issued to the driver when the value of the warning flag is set to 1 (time chart (C) of FIG. 7). Thus, the driver is notified when the deceleration control executed by the controller 3 results in automatic deceleration of the vehicle with a relatively large target deceleration rate Xgs.

Figure 8:
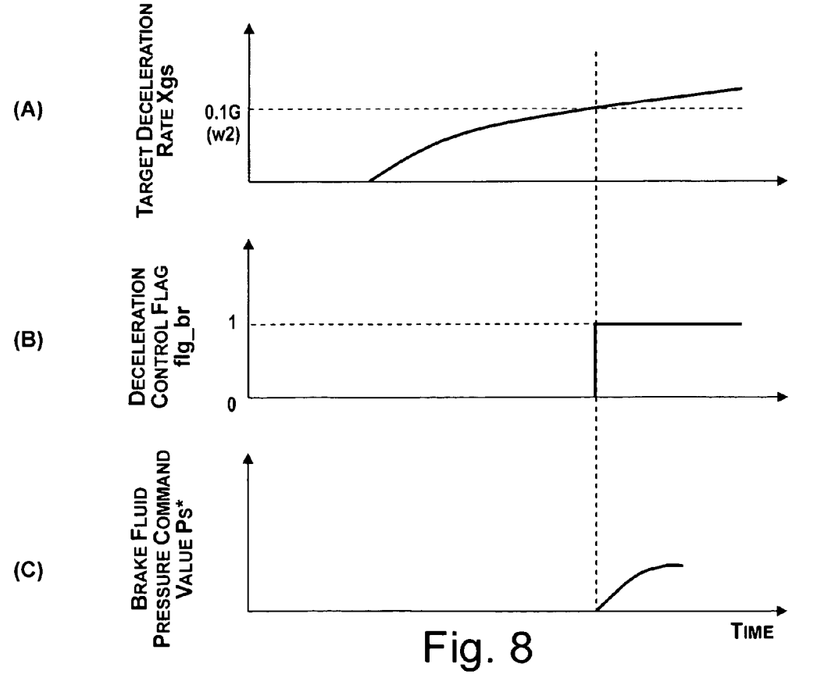
FIG. 8 is a set of time charts (A), (B) and (C) for explaining changes in a target deceleration rate (time chart (A)), a deceleration control flag (time chart (B)) and a brake fluid pressure command value (time chart (C)) with respect to time in accordance with the embodiment of the present invention.

In step S8, the controller 3 is configured to determine if the deceleration control should be executed. For example, a deceleration control execution determining section (not shown in figures) of the controller 3 or the brake fluid pressure command section 34 of the controller 3 is configured to make the determination as to whether or not to execute the deceleration control. FIG. 8 is a set of time charts (A), (B) and (C) illustrating changes in the target deceleration rate Xgs (time chart (A)), a deceleration control flag flg_br (time chart (B)), and a brake fluid pressure command value Ps* (time chart (C)) with respect to time. As shown in FIGS. 5 and 8, the value of the deceleration control flag flg_br is set to 1 (flg_br=1) (time chart (B) of FIG. 8) if the target deceleration rate Xgs calculated in step S6 is larger than a prescribed value or control execution threshold value w2 (e.g., 0.1 G) (i.e., Xgs>w2) (time chart (A) of FIG. 8).

In step S9, the brake fluid pressure command section 34 is configured to calculate the brake fluid pressure value Ps based on the target deceleration rate Xgs calculated in step S6. For example, the brake fluid pressure command section 34 is configured to calculate the brake fluid pressure value Ps using the equation (4) shown below.

$$Ps = Xgs \times K \quad (4)$$

In the equation (4), the value K is a gain for converting the target deceleration rate Xgs into the brake fluid pressure value Ps. The target deceleration rate Xgs used to calculate the brake fluid pressure value Ps is limited to a maximum value Xgs_max. The maximum value Xgs_max is set to, for example, 0.15 G.

Then, a brake fluid pressure command value Ps* is calculated using the equation (5) shown below, which is contrived to apply a filter to the equation (4).

$$Ps^* = f(Ps) \quad (5)$$

If the map matching operation of the navigation system 1 detected in step S11 causes the vehicle position to move such that the preceding curve is suddenly detected in front of the vehicle, the controller 3 is configured to evaluate the vehicle position in step S91 and to revise the deceleration control if necessary in step S92. The control processing executed in steps S91 and S92 will be described in more detail below.

In step S10, the controller 3 is configured to output the deceleration control and the warning to the vehicle based on the results of steps S7 and S8 and the steps S91 and S92 (described later). The warning is issued, for example, as a sound or as an image on an HUD (head-up display). The deceleration control involves the controller 3 outputting the brake fluid pressure command value Ps* calculated in step S9 to the brake control device 4 and the brake control device 4 executing braking control based on the brake fluid pressure command value Ps*.

Thus, the warning is issued (time chart (C) of FIG. 7) when the warning flag is set to 1 and braking control for achieving a brake fluid pressure corresponding to the brake fluid pressure command value Ps* is started when the deceleration control flag flg_br is set to 1 (time chart (C) of FIG. 8). Under normal circumstances (the normal deceleration control), the vehicle is decelerated inside a deceleration control region that spans from the deceleration start position to the target node point (N1), as indicated with the broken line in FIG. 5. Also under normal circumstances, the deceleration control is configured and arranged such that the vehicle speed reaches the target vehicle speed Vr when the vehicle is at the target node point (N1).

On the other hand, when it is detected that the map matching operation of the navigation system 1 detected in step S11 causes the vehicle position to move such that the preceding curve is suddenly detected in front of the vehicle in step S91, the deceleration control is revised in step S92 so that an appropriate deceleration control is executed with respect to the preceding curve.

More specifically, in step S91, the position evaluating section 36 is configured to determine if the vehicle traveling position coincides with a position where the deceleration control should be executed with respect to the preceding curve detected in front of the vehicle.

In this embodiment, for example, if the preceding curve is detected in front of the vehicle when the map matching flag flg_mac_chg is set to 1 in step S11 (flg_mac_chg=1), then in step S3 a node point where the preceding curve starts will be set as the target node point. Then, a revision permission flag flg_cng_ok is set to 1 (flg_cng_ok=1) depending on the positional relationship between the target node point and the vehicle position. More specifically, the controller 3 is configured to calculate the target deceleration rate Xgs corresponding to when the map matching flag flg_mac_chg was set to 1, and then to set the revision permission flag flg_cng_ok to 1 if the target deceleration Xgs is larger than the control execution threshold value w2 (e.g., 0.1 G). By comparing the target deceleration Xgs to the control execution threshold value w2, the controller 3 can determine if it is too late to execute normal deceleration control.

When the map matching flag flg_mac_chg changes to 1 and when the target deceleration rate Xgs is equal to or smaller than the control execution threshold value w2 (flg_cng_ok=0), the normal deceleration control can be started as shown in the broken line in FIG. 5. However, when the map matching flag flg_mac_chg changes to 1 and when the map the target deceleration rate Xgs is larger than the control execution threshold value w2 (flg_cng_ok=1), then the timing for initiating the normal deceleration control has passed and it would be difficult to accomplish a deceleration pattern that is well suited to the preceding curve in front of the vehicle using the normal deceleration control. Thus, in such case, the cruise control system of the present invention is configured to revise the control details of the deceleration control so that an appropriate deceleration control for the preceding curve can be executed.

In this way, by setting the value of the control change permission flag flg_mac_chg based on a target deceleration rate Xgs corresponding to the point in time when the map matching flag flg_mac_chg was set to 1, a deceleration control that is well matched to the positional relationship between the vehicle and the preceding curve can be executed when the preceding curve is suddenly detected directly in front of the vehicle due to the map matching operation. The condition for setting the revision permission flag flg_cng_ok to 1 does not necessarily have to be based on a comparison with the control execution threshold value w2. For example, it is also acceptable to compare the target deceleration rate Xgs to a prescribed target deceleration rate, e.g., the maximum value Xgs_max (0.15 G).

Moreover, it is also acceptable to configure the cruise control system of the present invention to calculate the distance between the target node point and the vehicle at the point in time when the map matching flag flg_mac_chg was set to 1 and to compare the calculated distance to a prescribed distance in step S91. If the calculated distance is equal to or below the prescribed distance, the cruise control system determines that the preceding curve corresponding to the target node point is directly in front of (imminently close to) the vehicle and sets the revision permission flag flg_cng_ok to 1. Instead of calculating the distance between the target node point and the vehicle position, it is also acceptable to use the distance Lj for the corresponding node point that was read in step S1. The prescribed distance is, for example, 50 m.

It is also acceptable to configure the cruise control system to calculate or otherwise determine the time required for the vehicle to reach the target node point from the position of the vehicle at the point in time when the map matching flag flg_mac_chg was set to 1 (flg_mac_chg=1) and to set the revision permission flag_flg_cng ok to 1 (flg_cng_ok=1) if the calculated time is equal to or less than a prescribed amount of time in step S91. In such a case, the prescribed time might be, for example, 2 seconds.

Although, in these examples explained above, the prescribed distance and the prescribed amount of time are fixed values, it is acceptable to set the prescribed distance or the prescribed amount of time based on the vehicle speed history in the vicinity of the point in time when the value of the map matching flag flg_mac_chg changed to 1. It is also acceptable to set the prescribed distance or the prescribed time based on the magnitude of the target deceleration rate calculated at the point in time when the value of the map matching flag flg_mac_chg changed to 1.

It is also acceptable to make a comprehensive determination regarding the target deceleration rate Xgs, the prescribed distance, and the prescribed amount of time in step S91 and set the revision permission flag flg_cng_ok to 1 based on the result of the comprehensive determination.

When the revision permission flag flg_cng_ok has been set to 1 in step S91, the deceleration control revising section 37 is configured to revise the control details of the deceleration control in step S92. More specifically, in step S92, the deceleration control revising section 37 is configured to perform at least one of setting the execution continuation time ts of the deceleration control (deceleration control execution continuation requirements) and revising the deceleration rate (e.g., the target deceleration rate or the brake fluid pressure command value). Different examples of revising the control details in step S92 will now be explained.

Setting the Execution Continuation Time of the Deceleration Control

In the first example, the deceleration control revising section 37 is configured to revise the deceleration control by setting the control execution continuation time ts of the deceleration control (deceleration control execution continuation conditions) in step S92. In other words, the deceleration control revising section 37 is configured to extend an end position of the deceleration control region, in which the deceleration control is executed, to a position inside the preceding curve so that the target vehicle speed Vr is achieved in the position inside the preceding curve.

More specifically, when the map matching flag flg_mac_chg is set to 1 in step S11 (flg_mac_chg=1), the revision permission flag flg_cng_ok is set to 1 in step S91 (flg_cng_ok=1), and the deceleration control execution flag flg_br is set to 1 in step S8 (flg_br=1) at time t (t=0) (FIG. 9), the control execution time (control execution continuation time) ts can be set using the equation (6) shown below.

$$ts = t1 + \Delta t \quad (6)$$

In the equation (6), the value t1 is an amount of time required for the vehicle to reach the deceleration end position (the target node point) when the vehicle is decelerated at a prescribed deceleration rate (e.g., the maximum deceleration value (0.1 5 G)) and the value Δt is a prescribed amount of time. Thus, the control execution time ts is an amount of time that elapses from the time t (t=0) when the deceleration control flag flg_br is set to 1. For example, if the prescribed amount of time Δt is 4 seconds, then the deceleration control will be executed continuously for the amount of time ts (=t1+4). The amount of time ts is set to, for example, the amount of time required for the vehicle to be decelerated to the target vehicle speed Vr associated with the target node point if the vehicle is decelerated from its current speed at the maximum value Xgs_max (0.15 G) of the target deceleration rate. Such a case is illustrated with a single-dot chain line in FIG. 5. With this deceleration control, the vehicle can be decelerated to the target vehicle speed Vr at a point when the vehicle is traveling within the curve. The prescribed amount of time Δt can be set in advance to a fixed value (e.g., 8 seconds) within which it is estimated that the vehicle can be decelerated to the target vehicle speed with time to spare (i.e., in a gradual manner without the use of excessive braking force).

Figure 9:
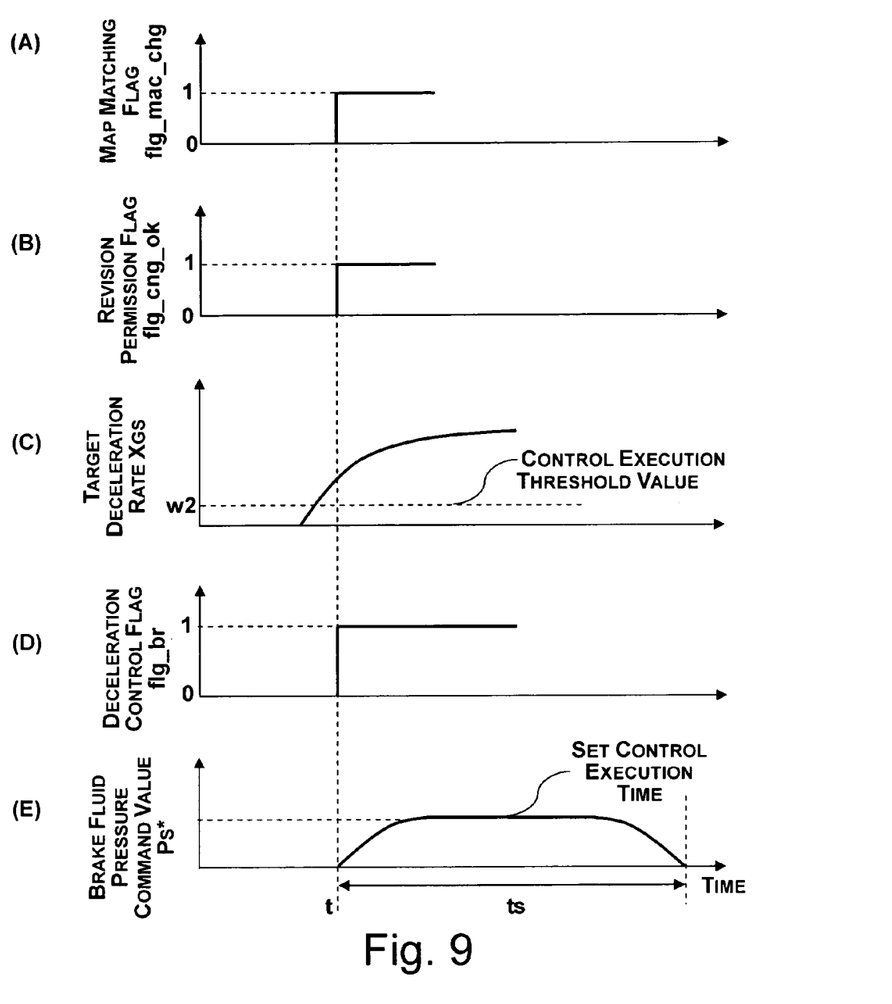
FIG. 9 is a set of time charts (A), (B), (C), (D) and (E) for explaining changes in a map matching flag (time chart (A)), a revision permission flag (time chart (B)), a target deceleration rate (time chart (C)), a deceleration control flag (time chart (D)) and a brake fluid pressure command value (time chart (E)) with respect to time when the deceleration control is adjusted by setting the control execution time in the cruise control system in accordance with the embodiment of the present invention.

The deceleration control executed in this example will be explained in more detail with reference to FIGS. 5 and 9. As shown in the time charts (A) to (E) of FIG. 9, when the target deceleration rate Xgs is above the control execution threshold value w2 (time chart (C) of FIG. 9) when the map matching flag flg_mac_chg is set to 1 in step S11 (time chart (A) of FIG. 9), the deceleration control execution flag flg_br is set to 1 in step S8 (time chart (D) of FIG. 9). When the revision permission flag flg_cng_ok has been set to 1 in step S91 (time chart (B) of FIG. 9) at the time t, the control execution time ts is set according to the equation (6) above. Thus, as the deceleration control is executed, the brake control device 4 generates a brake fluid pressure corresponding to the brake fluid pressure command value Ps* for ts seconds starting from the point in time t when the deceleration control flag flg_br is set to 1 (time chart (E) of FIG. 9).

Since the deceleration control is executed for ts seconds, the deceleration control is not stopped at the target node point where the curve starts. Rather, the deceleration control will continue after the vehicle enters within the curve. The target vehicle speed Vr (which was calculated in step S5 with respect to the target node point in the normal deceleration control) will be reached when the vehicle reaches a point within the curve after the deceleration control is executed for ts seconds. In short, in the cruise control system in accordance with the present invention, if the map matching operation causes the vehicle position to move in the map such that the preceding curve is suddenly detected directly in front of the vehicle, the deceleration control that is appropriate for the preceding curve can be executed.

Figure 10:
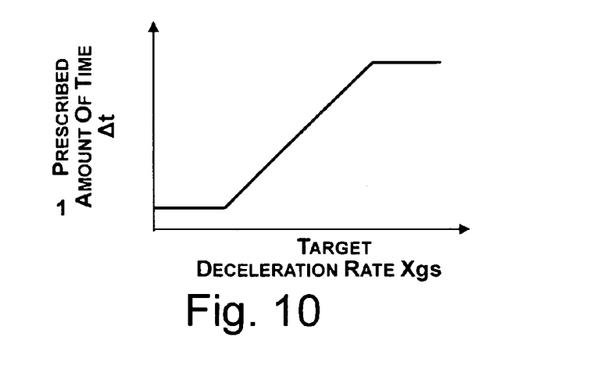
FIG. 10 is a characteristic plot of a prescribed amount of time used to set a control execution time versus the target deceleration rate in accordance with the embodiment of the present invention.

The control execution time ts calculated with the equation (6) changes depending on the prescribed amount of time Δt. It is acceptable to set the prescribed amount of time Δt based on the target deceleration rate Xgs. For example, as shown in FIG. 10, the prescribed amount of time Δt can be set to have a fixed small value when the target deceleration rate Xgs is smaller than a first predetermined value, to increase as the target deceleration rate Xgs increases when the target deceleration rate Xgs is in an intermediate region, and to have a fixed larger value when the target deceleration rate Xgs is larger than a second predetermined value. In other words, the prescribed amount of time Δt can be set such that, generally speaking, the prescribed amount of time Δt increases as the target deceleration rate Xgs increases.

Thus, even if the deceleration control amount is set to become larger as the target deceleration rate Xgs increases, the deceleration control that is appropriate for the preceding curve directly in front of the vehicle can be achieved because the prescribed amount of time Δt increases, and thus, the control execution time ts increases as the target deceleration rate Xgs increases.

Although in this example of revising the deceleration control in accordance with the present invention, the control details of the deceleration control are changed from the perspective of the control execution time, it is acceptable to change the control details (i.e., set the control execution time) such that the deceleration control is executed until the vehicle position reaches a prescribed position within the curve. The prescribed position within the curve is, for example, the position (e.g., in the vicinity of the node point N3 as shown in the single-dot chain line in FIG. 5) where the vehicle can be decelerated to the target vehicle speed Vr (which was calculated in step S5 with respect to the target node point) if the vehicle is decelerated from its current speed at the maximum value Xgs_max (0.15 G) of the target deceleration rate. It is also acceptable to set the prescribed position to an intermediate position within the curve or a position located a prescribed distance away (in the frontward direction with respect to the vehicle) from the target node point. With any of these approaches, the deceleration control can be executed in a manner well suited to the shape of the curve because the deceleration control is continued until the vehicle reaches a prescribed position within the curve.

Changing the Target Deceleration Rate

Figure 11:
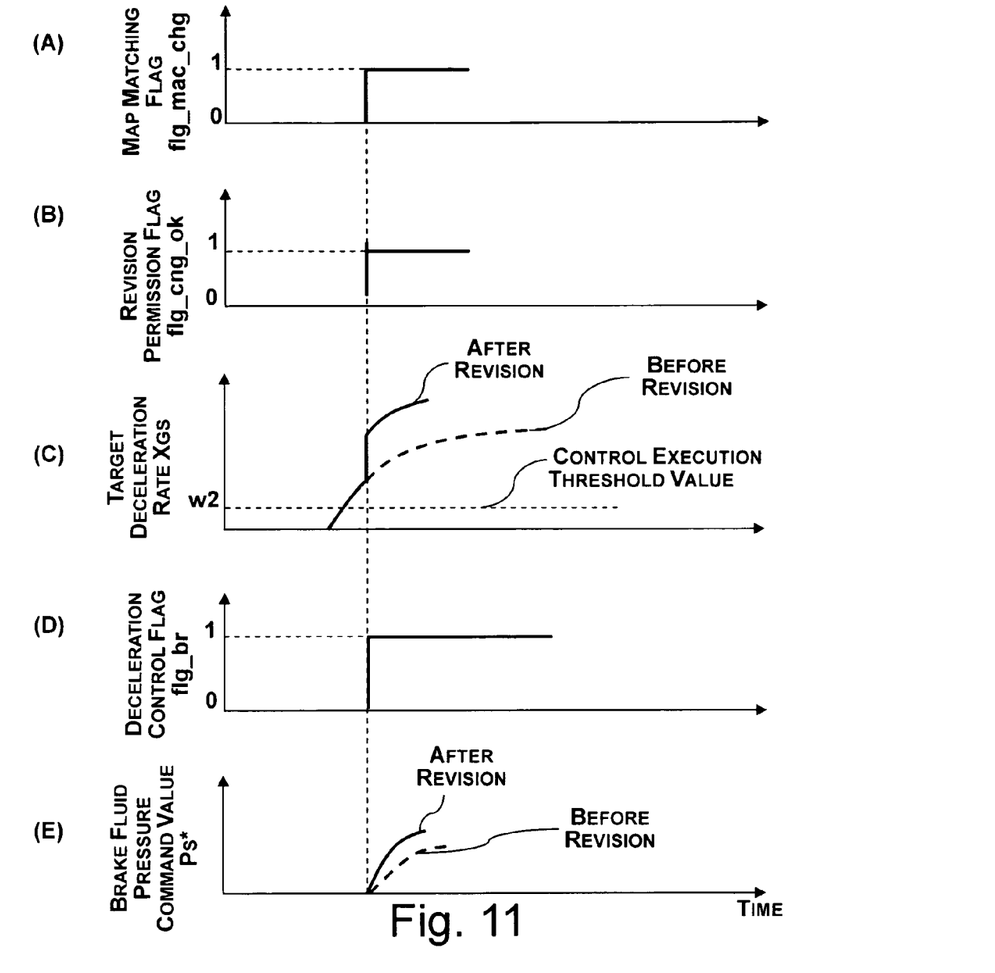
FIG. 11 is a set of time charts (A), (B), (C), (D) and (E) for explaining changes in a map matching flag (time chart (A)), a revision permission flag (time chart (B)), a target deceleration rate (time chart (C)), a deceleration control flag (time chart (D)) and a brake fluid pressure command value (time chart (E)) with respect to time when the deceleration control is adjusted by changing the target deceleration rate in the cruise control system in accordance with the embodiment of the present invention.
Figure 12:
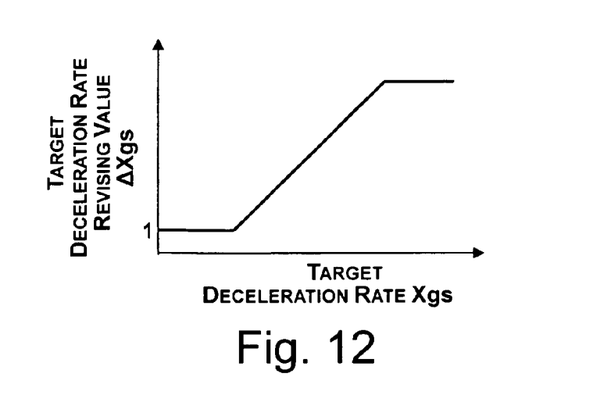
FIG. 12 is a characteristic plot of a target deceleration rate revising value used for revising the target deceleration rate versus the target deceleration rate in accordance with the embodiment of the present invention.

Another example of revising the control details of deceleration control in step S92 will be explained with reference to FIGS. 11 and 12. Instead of setting the control execution time ts as described in the previous example, the target deceleration rate Xgs calculated in step S6 is revised in this example, thereby revising the deceleration control amount of the deceleration control.

In other words, when the map matching flag flg_mac_chg is set to 1 in step S11 (flg_mac_chg=1), the revision permission flag flg_cng_ok is set to 1 in step S91 (flg_cng_ok=1), and the deceleration control execution flag flg_br is set to 1 in step S8 (flg_br=1), the target deceleration rate Xgs calculated in step S6 is revised to a larger value. For example, the target deceleration rate Xgs is increased using the equation (7) shown below.

$$Xgs_{revised}=Xgs \times G1 \qquad (7)$$

Alternatively, the target deceleration rate Xgs can also be increased using the equation (8) shown below.

$$Xgs_{revised}=Xgs+\Delta Xgs \qquad (8)$$

In the equation (7), the value G1 is a gain for revising the target deceleration rate Xgs. In the equation (8), the value $\Delta Xgs$ is a target deceleration rate revising value by which the target deceleration rate is revised.

The method of revising the control details by changing the deceleration control amount will now be described with reference to time charts (A) to (E) of FIG. 11. As shown in FIG. 11, the deceleration control execution flag flg_br is set to 1 in step S8 (time chart (D) of FIG. 11) if the target deceleration rate Xgs is above the control execution threshold value w2 (time chart (C) of FIG. 11) when the map matching flag flg_mac_chg is set to 1 in step S11 (time chart (A) of FIG. 11). If the revision permission flag flg_cng_ok has been set to 1 in step S91 (time chart (B) of FIG. 11), then the target deceleration rate Xgs calculated in step S6 is revised to a larger value (time chart (C) of FIG. 11) by using the above equation (7) or (8). As a result, the controller 3 is configured to generate the brake fluid pressure control value Ps* for achieving the revised target deceleration rate $Xgs_{revised}$ (time chart (E) of FIG. 11) at the point in time when the deceleration control flag flg_br is set to 1. The brake control device 4 is then configured to generate a brake fluid pressure corresponding to the brake fluid pressure command value Ps*. Since the target deceleration rate is limited by a maximum value Xgs_max (0.15 G), the maximum value Xgs_max is preferably revised to a larger value in the same manner as the revision of the target deceleration rate Xgs. It is preferable to provide a limit value that limits the amount by which the target deceleration rate Xgs can be revised. For example, the revision value could be limited such that the revised target deceleration rate does not exceed 0.25 G.

The revision of the target deceleration rate Xgs in this example is contrived to increase the target deceleration rate Xgs to, for example, the deceleration rate required to decelerate the vehicle to the target vehicle speed Vr by the time the vehicle reaches the target node point (N1), as indicated with the double-dot chain line in FIG. 5. As a result, the vehicle can be reliably decelerated to the target vehicle speed Vr by the time it reaches the target node point.

Instead of revising the target deceleration rate Xgs so as to reach the target vehicle speed Vr at the target node point, it is also acceptable to, for example, set the revising gain or the revising value (G1 or $\Delta Xgs$) to a prescribed value that is determined in advance.

Since the target deceleration rate Xgs is revised to a larger value in this example, the brake fluid pressure (brake fluid pressure command value Ps*) used for the deceleration control is also revised to a larger value. As a result, if a curve is detected directly in front of the vehicle due to the map matching operation, the vehicle can be decelerated to the target vehicle speed Vr at the target node point of the curve (the start point of the curve (N1) in the example shown in FIG. 5).

In the example presented above, the target deceleration rate Xgs is revised (increased) using the target deceleration rate revising gain G1 or the target deceleration rate revising value $\Delta Xgs$ in the equation (7) or (8). The revising gain or the revising value (G1 or $\Delta Xgs$) is preferably set in accordance with the target deceleration rate Xgs. For example, as shown in FIG. 12, the target deceleration rate revising value $\Delta Xgs$ can be set to have a fixed smaller value when the target deceleration rate Xgs is smaller than a certain value, to increase as the target deceleration rate Xgs increases when the target deceleration rate Xgs is in an intermediate region, and to have a fixed larger value when the target deceleration rate Xgs is larger than a certain value. In other words, the target deceleration rate revising value $\Delta Xgs$ can be set such that, generally speaking, the target deceleration rate revising value $\Delta Xgs$ increases as the target deceleration rate Xgs increases.

By setting the target deceleration rate revising value $\Delta Xgs$ such that it increases as the target deceleration Xgs increases, a deceleration control that is appropriate for the curve directly in front of the vehicle can be executed even when the map matching operation of the navigation system 1 causes the traveling position of the vehicle in the map to move relatively immediately before the curve.

Changing the Brake Fluid Pressure Command Value

Figure 13:
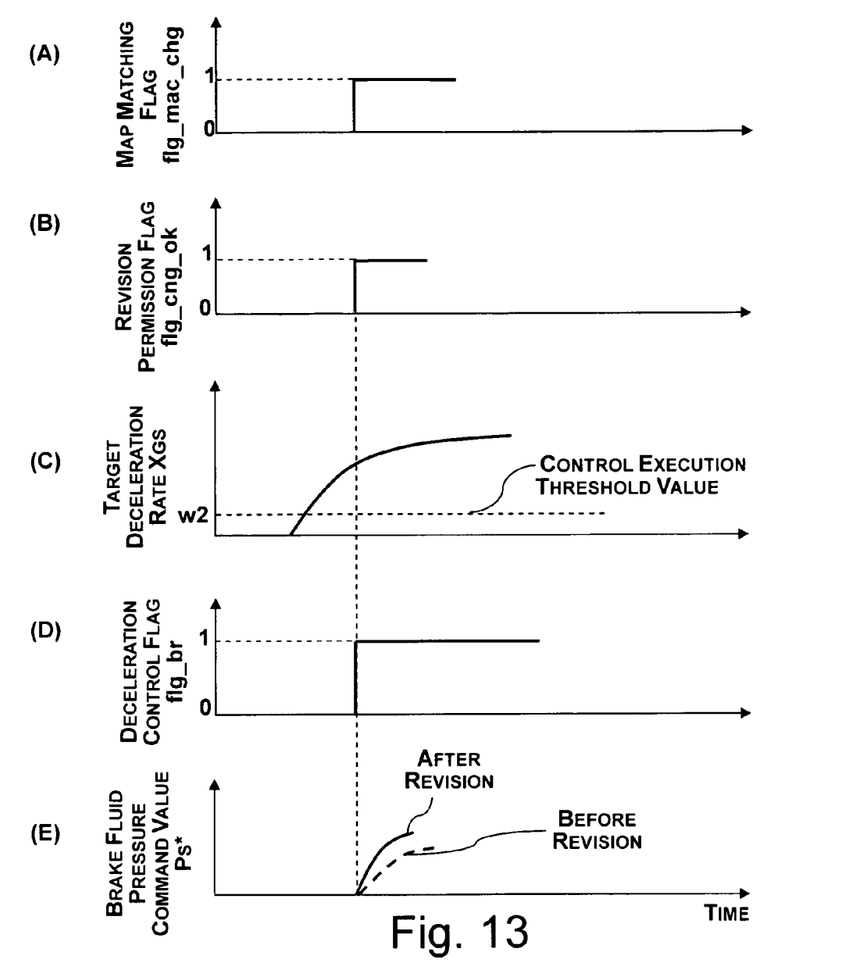
FIG. 13 is a set of time charts (A), (B), (C), (D) and (E) for explaining changes in a map matching flag (time chart (A)), a revision permission flag (time chart (B)), a target deceleration rate (time chart (C)), a deceleration control flag (time chart (D)) and a brake fluid pressure command value (time chart (E)) with respect to time when the deceleration control is changed by changing the brake fluid pressure command value in the cruise control system in accordance with the embodiment of the present invention.
Figure 14:
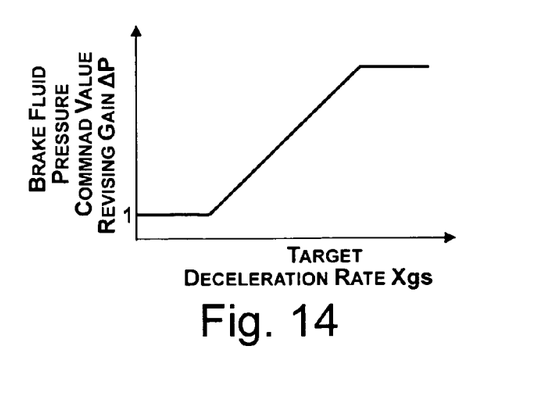
FIG. 14 is a characteristic plot of a brake fluid pressure command value revising gain used for revising the brake fluid pressure command value versus the target deceleration rate in accordance with the embodiment of the present invention.

Referring now to FIGS. 13 and 14, another example of revising the control details of deceleration control in step S92 will be explained. In this example, instead of setting the control execution time ts or as described or revising the target deceleration rate Xgs in the previous examples, the brake fluid pressure command value Ps* is directly revised by revising a brake fluid pressure command value revising gain $\Delta P$ (brake control gain), thereby revising the deceleration control amount of the deceleration control.

In other words, when the map matching flag flg_mac_chg is set to 1 in step S11 (flg_mac_chg=1), the revision permission flag flg_cng_ok is set to 1 in step S91 (flg_cng_ok=1), and the deceleration control execution flag flg_br is set to 1 in step S8 (flg_br=1), the brake fluid pressure command value Ps* is revised to a larger value. For example, the brake fluid pressure command value Ps* calculated in step S9 (see the equation (5)) can be revised to a larger value using the equation (9) shown below.

$$Ps^{*}=Ps^{*} \times \Delta P(=f(Ps) \times \Delta P) \qquad (9)$$

In the equation (9), the value $\Delta P$ is the brake fluid pressure command value revising gain (prescribed value).

The method of revising the control details by revising the brake fluid pressure command value Ps* will now be described with reference to time charts (A) to (E) of FIG. 13. As shown in FIG. 13, the deceleration control execution flag flg_br is set to 1 in step S8 (time chart (D) of FIG. 13) if the target deceleration rate Xgs is above the control execution threshold value (time chart (C) of FIG. 13) when the map matching flag flg_mac_chg is set to 1 in step S11 (time chart (A) of FIG. 13). If the revision permission flag flg_cng_ok has been set to 1 in step S91 (time chart (B) of FIG. 13), then the brake fluid pressure command value Ps* calculated in step S9 (see the equation (5)) is revised to a larger value (time chart (E) of FIG. 13). The brake control device 4 is then configured to generate a brake fluid pressure corresponding to the revised brake fluid pressure command value Ps*.

The revision of the brake fluid pressure command value Ps* in this example is contrived to increase the brake fluid pressure to, for example, the brake fluid pressure required to decelerate the vehicle to the target vehicle speed Vr by the time the vehicle reaches the target node point (N1), as indicated with the double-dot line in FIG. 5. Instead of setting the brake fluid pressure command value Ps* so as to decelerate the vehicle to the target vehicle speed Vr at the target node point, it is also acceptable to set the revising gain (ΔP) to a prescribed value in advance. It is preferable to provide a limit value that limits the amount by which the brake fluid pressure command value Ps* can be revised. For example, the revising value can be set such that the brake fluid pressure command value Ps* does not exceed a maximum value Ps*_max.

Since the brake fluid pressure command value Ps* (see the equation (5)) is revised to a larger value, the brake fluid pressure used for the deceleration control is also revised to a larger value. As a result, when a curve is detected directly in front of the vehicle due to the map matching operation, the vehicle can be decelerated to the target vehicle speed by the time the vehicle reaches the entrance of the curve (the node point N1 in the example illustrated in FIG. 5).

Although the equation (9) uses a fixed brake fluid pressure command value revising gain ΔP to revise the brake fluid pressure command value Ps* to a larger value, it is also acceptable to vary the brake fluid pressure command value revising gain ΔP in accordance with the target deceleration rate Xgs. For example, as shown in FIG. 14, the brake fluid pressure command value revising gain ΔP can be set to have a fixed smaller value when the target deceleration rate Xgs is smaller than a certain value, to increase as the target deceleration rate Xgs increases when the target deceleration rate Xgs is in an intermediate region, and to have a fixed larger value when the target deceleration rate Xgs is larger than a certain value. In other words, the brake fluid pressure command value revising gain ΔP can be set such that, generally speaking, the brake fluid pressure command value revising gain ΔP increases as the target deceleration rate Xgs increases.

By setting the brake fluid pressure command value revising gain ΔP such that it increases as the target deceleration Xgs increases, a deceleration control that is appropriate for the curve directly in front of the vehicle can be executed even when the map matching operation of the navigation system 1 causes the traveling position of the vehicle in the map to move relatively immediately before the curve.

Although in this example the brake fluid pressure command value Ps* is revised using a brake fluid pressure command value revising gain ΔP, the present invention is not limited to such a method. For example, it is acceptable to revise the brake fluid pressure command value Ps* to a larger value by increasing the maximum value Xgs_max that limits the brake fluid pressure value Ps calculated with the equation (4). It is also acceptable to revise the brake fluid pressure command value Ps* to a larger value by revising the slope of the filter f used in the equation (5) in step S9.

Moreover, it is also acceptable to combine revising the control execution time ts (or the deceleration end position) with revising the deceleration control amount (the deceleration rate and/or the brake fluid pressure) in step S92. For example, the cruise control system can be configured to revise the maximum value Xgs_max of the target deceleration rate and set the deceleration end position to the position by which the vehicle can be decelerated to the target vehicle speed Vr if it is decelerated at the revised maximum value Xgs_max. Alternatively, it is also acceptable to configure the cruise control system to set a prescribed position along the curve as the deceleration end position and revise the target deceleration rate Xgs such that the target vehicle speed is reached when the vehicle reaches the prescribed position. With either of these combination approaches, the amount by which the target deceleration rate Xgs is increased can be reduced and the amount by which the braking time is extended beyond the target node point can be reduced.

Accordingly, the cruise control system in accordance with the present invention is configured to revise the deceleration control (e.g., setting the control execution time ts and/or increasing the deceleration control amount) when map matching operation executed by the navigation system 1 has caused the traveling position of the vehicle on a map to move onto a road the vehicle is estimated to be traveling on and the traveling position of the vehicle obtained after the map matching operation is inside the deceleration control region (region where deceleration control should be executed). The increase in the deceleration control amount being based on a positional relationship with respect to the curve existing in front of the vehicle. As a result, even if a curve is suddenly detected directly in front of the vehicle due to the map matching operation, the deceleration control can be executed in a manner that is well suited to the curve.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately"

as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cruise control system comprising:
a curve state detecting section configured to detect a curve state of a curve existing in front of a vehicle based on information obtained by a navigation system;
a target deceleration rate calculating section configured to calculate a target deceleration rate at which the vehicle is decelerated within a deceleration control region before the curve based on the curve state detected by the curve state detecting section;
a deceleration control section configured to execute deceleration control of the vehicle within the deceleration control region based on the target deceleration rate calculated by the target deceleration rate calculating section;
a map matching detecting section configured to detect whether a map matching operation executed by the navigation system caused a vehicle traveling position in a map to move onto a traveling road on which the vehicle is estimated to be traveling;
a position evaluating section configured to determine whether the vehicle traveling position after the map matching operation is within the deceleration control region; and
a revising section configured to extend an end position of the deceleration control region to a position inside the curve when the position evaluating section determines that the vehicle traveling position after the map matching operation is within the deceleration control region.

2. The cruise control system recited in claim 1, wherein
the target deceleration rate calculating section is further configured to calculate the target deceleration rate such that a target vehicle speed suited to the curve state will be achieved before the vehicle reaches the curve and to set a maximum value of the target deceleration rate in advance, and
the revising section is further configured to set the end position of the deceleration control region to a position where the vehicle will be when the vehicle is decelerated at the maximum value of the target deceleration rate until the target vehicle speed is reached if the deceleration control is started at the vehicle traveling position after the map matching operation.

3. The cruise control system recited in claim 1, wherein the position evaluating section is further configured to determine whether the vehicle traveling position after the map matching operation is within the deceleration control region based on the target deceleration rate calculated based on the vehicle traveling position after the map matching operation.

4. The cruise control system recited in claim 3, wherein
the position evaluating section is further configured to determine that the vehicle traveling position after the map matching operation is within the deceleration control region when the target deceleration rate calculated based on the vehicle traveling position after the map matching operation is larger than a prescribed threshold value.

5. The cruise control system recited in claim 1, wherein
the revising section is further configured to extend the end position of the deceleration control region by setting a control execution time of the deceleration control.

6. A cruise control system comprising:
curve state detecting means for detecting a curve state of a curve existing in front of a vehicle;
target deceleration rate calculating means for calculating a target deceleration rate at which the vehicle is decelerated within a deceleration control region before the curve based on the curve state detected by the curve state detecting means;
deceleration control means for executing deceleration control of the vehicle within the deceleration control region based on the target deceleration rate calculated by the target deceleration rate calculating means;
map matching detecting means for detecting whether a map matching operation executed by a navigation system caused a vehicle traveling position in a map to move onto a traveling road on which the vehicle is estimated to be traveling;
position evaluating means for determining whether the vehicle traveling position after the map matching operation is within the deceleration control region when the map matching detecting means detects that the map matching operation caused the vehicle traveling position in the map to move onto the traveling road; and
revising means for changing the deceleration control when the position evaluating means determines that the vehicle traveling position after the map matching operation is within the deceleration control region by extending an end position of the deceleration control region to a position inside the curve.

7. A cruise control method comprising:
executing deceleration control of a vehicle within a deceleration control region before a curve existing in front of the vehicle;
detecting whether a map matching operation executed by a navigation system caused a vehicle traveling position in a map to move onto a traveling road on which a vehicle is estimated to be traveling; and
revising the deceleration control when the vehicle traveling position after the map matching operation is within the deceleration control region by extending an end position of the deceleration control region to a position inside the curve.

* * * * *